Nov. 25, 1952  J. E. DOOLEY  2,619,016
TWO-WAY PLOW
Filed Dec. 15, 1947  4 Sheets-Sheet 2

INVENTOR
J. E. Dooley
BY
ATTORNEYS

Nov. 25, 1952 J. E. DOOLEY 2,619,016
TWO-WAY PLOW
Filed Dec. 15, 1947 4 Sheets-Sheet 3

INVENTOR
J. E. Dooley
BY
ATTORNEYS

Nov. 25, 1952 J. E. DOOLEY 2,619,016
TWO-WAY PLOW
Filed Dec. 15, 1947 4 Sheets-Sheet 4
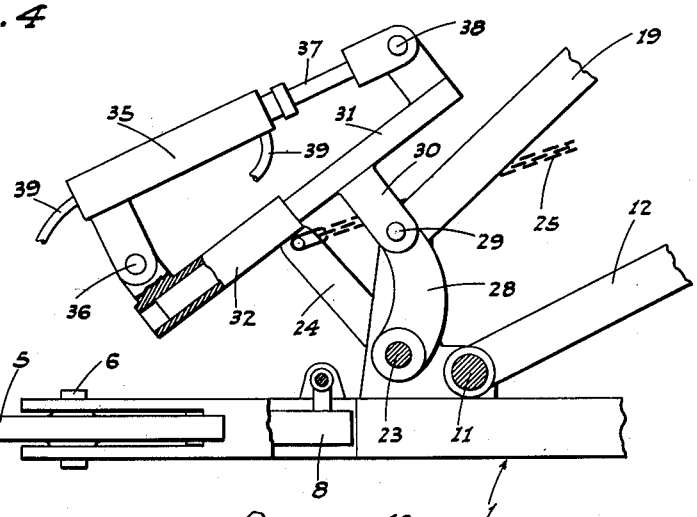
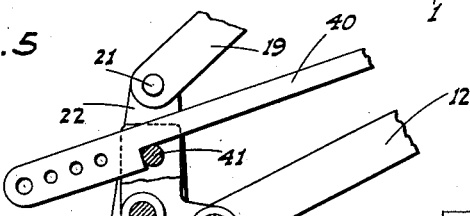
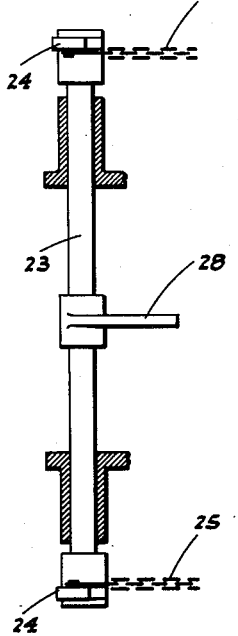
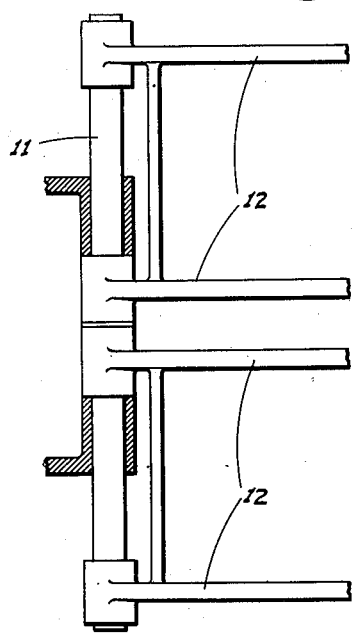
INVENTOR
J. E. Dooley
BY
ATTORNEYS Patented Nov. 25, 1952

2,619,016

UNITED STATES PATENT OFFICE 2,619,016

TWO-WAY PLOW

James E. Dooley, Tulare, Calif.

Application December 15, 1947, Serial No. 791,871

4 Claims. (Cl. 97—29)

This invention is directed to, and it is an object to provide, a novel two-way plow; i. e. a plow having a pair of transversely spaced plow units, one being right hand and the other left hand, and said plow units being power lifted to a latched raised position and mounted for selective and independent release to lowered position, whereby with travel back and forth in a field the plow units may be alternately lowered to ground engaging position for use, with the other then remaining in raised inoperative position.

Another object of the invention is to provide a plow, as above, wherein both plow units may be maintained latched in raised position for transport of the implement from place to place.

An additional object of the invention is to accomplish the aforesaid power lifting of the plow units between their lowered and raised positions by a novel mechanism including a single, fluid pressure actuated power cylinder.

A further object of the invention is to provide a plow of the type described wherein each of the separate plow units is of novel construction; each such plow unit being arranged in a manner so that when the corresponding swing or lift frame is raised about its axis there is a compensating action to maintain the shares generally level.

It is also an object of the present invention to provide a plow, of the type described, wherein each plow unit works adjacent a ground wheel of the implement and includes one share trailing the wheel and another share laterally out from said wheel, whereby full two-row coverage is obtained while permitting the wheel to ride firm ground.

A further object of the invention is to provide a practical and reliable plow, and one which will be exceedingly effective for the purpose for which it is designed.

These objects are accomplished by means of such structure and relative arrangement of parts as will fully appear by a perusal of the following specification and claims.

In the drawings:

Fig. 4 is a fragmentary elevation showing principally the fluid pressure actuated power cylinder and connections between the same and the operating cross shaft.

Fig. 5 is a fragmentary elevation showing principally one latch arm as engaged with the corresponding pin.

Fig. 6 is a fragmentary plan view illustrating the lift control cross shaft.

Fig. 7 is a fragmentary plan view showing the pivot shaft which carries the swing frames of the separate plow units.

Figure 1:
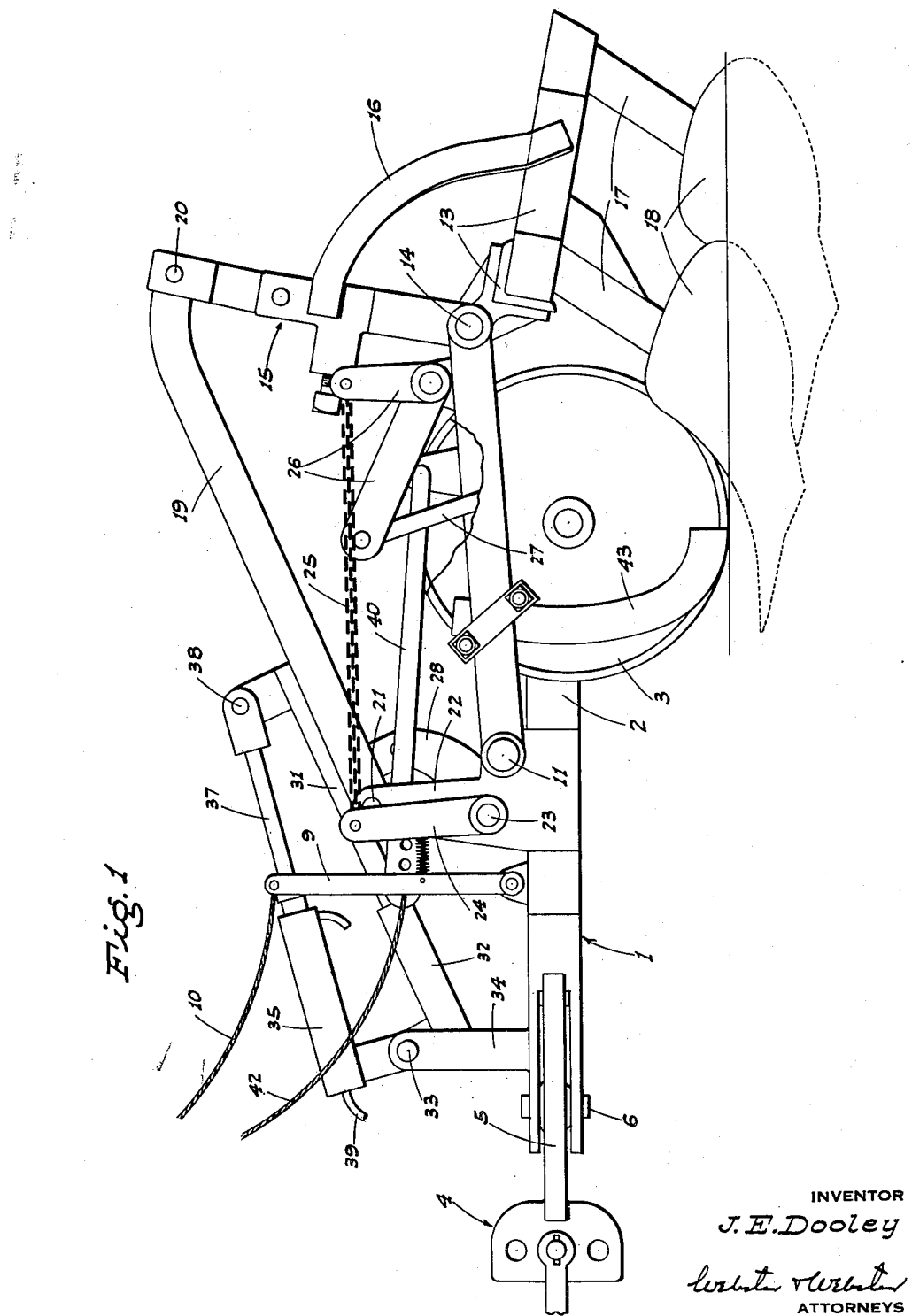
Fig. 1 is a side elevation of the implement as in use.

Referring now more particularly to the characters of reference on the drawings, the plow comprises a longitudinally extending main frame 1 having transversely spaced, rearwardly projecting legs 2, each of which is fitted with a ground engaging wheel 3 to support the implement at the rear.

At the front the main frame 1 is supported by a hitch 4, the line of draft of which is adjustable by means of a pivoted in plate 5 carried on a vertical axis pivot 6. The rear edge of the rotary plate 5 is notched, as at 7, and a slide dog 8 cooperates with the notches 7 in selective positions. Engagement of the slide dog 8 with a selected one of the notches 7 is controlled by a spring-urged lever 9 which upstands from the main frame 1; there being a pull cord 10 leading from the upper end of lever 9 forwardly to the tractor. With this arrangement, the spring-urged lever 9 normally maintains the slide dog 8 in connection with the notched pivoted in plate 5, but adjustment of the angle of draft, in a horizontal plane, can be accomplished by pulling on said core 10 and then turnably adjusting the plate 5.

Rearwardly of the lever 9, the main frame 1 carries, in journaled relationship, a transverse pivot shaft 11, which is of a length to project beyond corresponding legs 2, and a pair of transversely spaced, generally U-shaped swing frames 12 are journaled, at their forward ends, to the pivot shaft 11 for vertical swinging adjustment between lowered and raised positions, independently and selectively.

The separate plow units, indicated at A and B, respectively, each include, with the corresponding swing frame 12, substantially identical structures, and therefore a description of one of said plow units will suffice for both.

Each of the plow units A and B comprises a tool bar 13 projecting rearwardly from the trailing end of the corresponding swing frame 12, and pivoted thereto, as at 14, for relative vertical adjustment. Rigid with the forward portion of each tool bar 13 is an upstanding post 15 which is normally rigid, but is sectional, with the sections angularly adjustable in a longitudinal vertical plane, as shown.

Rigid connection arms 16 are secured between the lower section of each post 15 and the tool bar 13, whereby to maintain such parts in fixed relationship to each other.

A pair of standards 17 depend from each tool bar 13, and at their lower ends said standards carry plow shares 18; the shares of the plow units being disposed with the land side inwardly; i. e. the shares of one plow unit are right-hand, whereas the shares of the other plow unit are left-hand.

Figure 2:
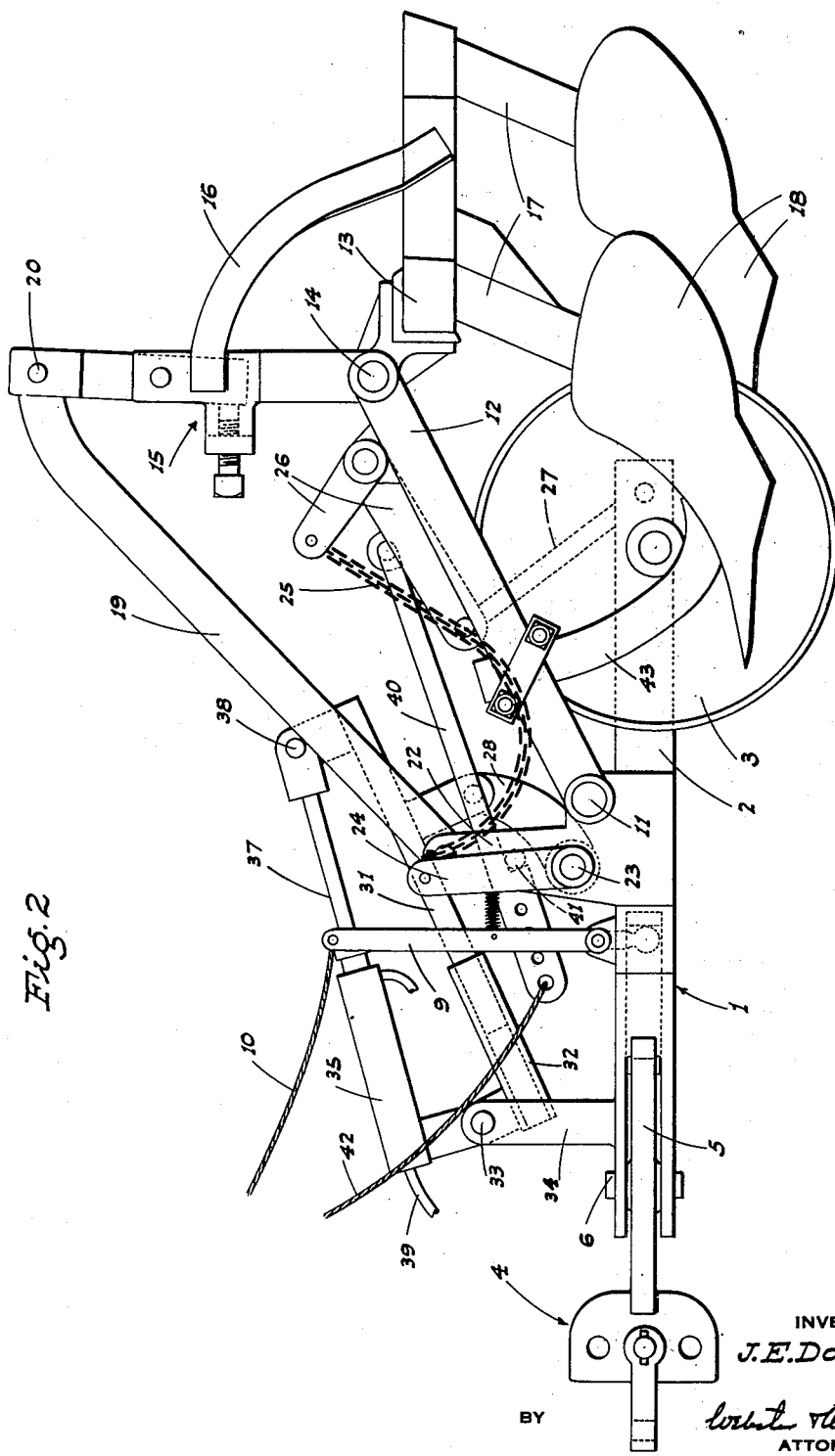
Fig. 2 is a similar view, but shows the plow units in raised position.
Figure 3:
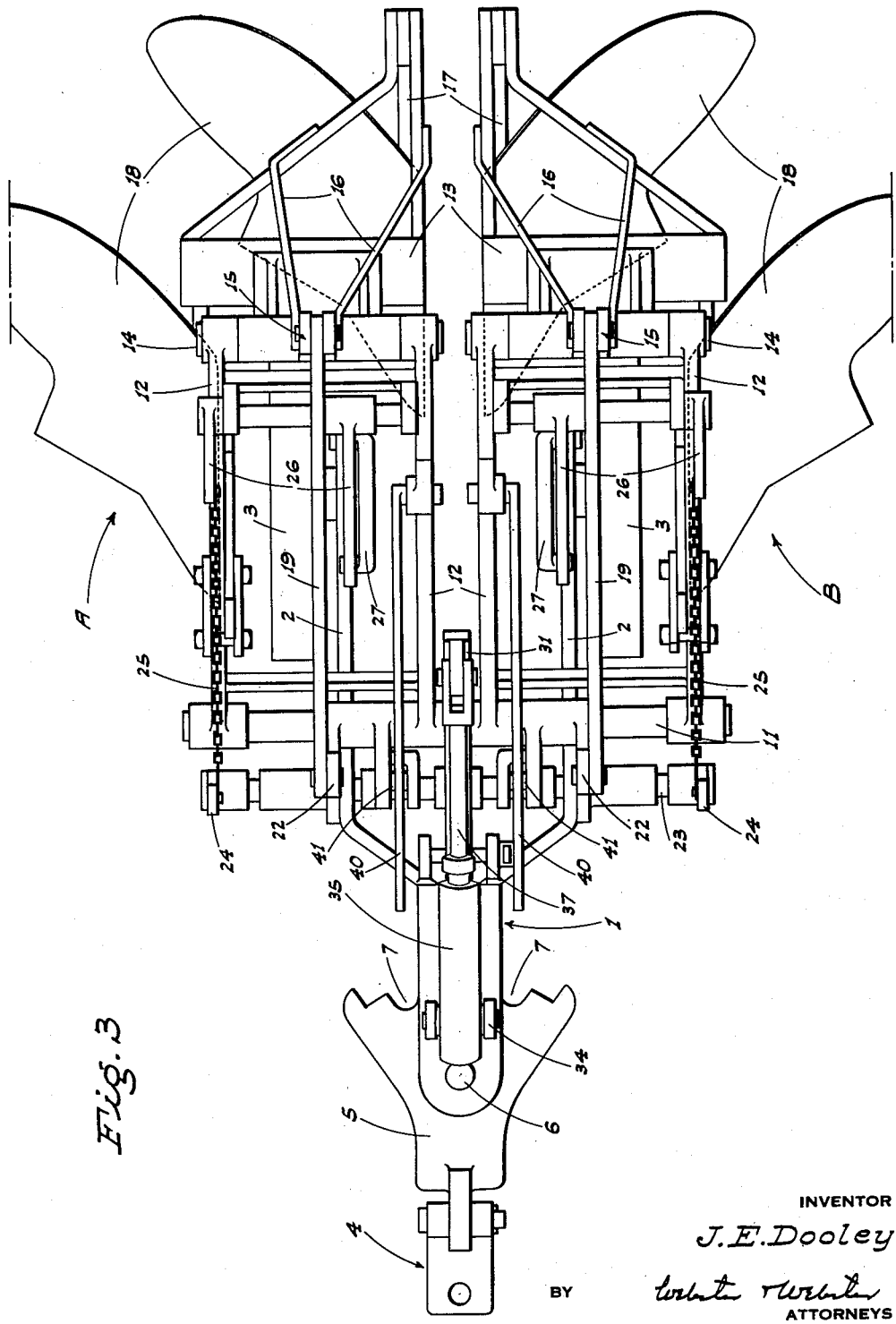
Fig. 3 is a plan view of the implement.

A tie bar 19 pivotally connects between the upper end of the post 15, as at 20, and thence extends at a forward and downward incline to pivotal connection, as at 21, with a fixed, upstanding post 22 on the main frame 1 ahead of the wheels. The length of the pivotally mounted tie bar 19 is such that with raising of the corresponding swing frame 12 from its lowered position with the shares 18 in ground engagement, as in Fig. 1, to raised position with said shares clear of the ground and inoperative, as in Fig. 2, there is a relative upward swinging of the tool bar 13, which accomplishes a compensating action to maintain the shares generally level.

The following mechanism is employed to accomplish raising or lifting of the plow units between their lowered and raised positions:

A lift control cross shaft 23 is journaled in connection with the main frame 1 ahead of the wheels 3, and at opposite ends includes upstanding levers 24. A chain 25 leads rearwardly from the upper end portion of each lever 24 to connection with a bellcrank lever assembly 26 on the corresponding swing frame 12 adjacent its rear end. A thrust link 27 connects between the opposite leg of each bellcrank lever assembly 26, and the corresponding leg 2 of the main frame 1.

With rotation of the lift control cross shaft 23 in a direction to swing the levers 24 forwardly, such motion transmitted through the above described assembly results in upward swinging motion of the lift frames 12, whereby to adjust the plow units A and B between lowered working positions and raised transport positions. This rotation of the lift control cross shaft 23 is accomplished as follows:

The lift control cross shaft 23 is fitted, between its ends, with a generally upstanding, radial lever 28, which is pivotally connected, as at 29, to the lower end of an attachment ear 30 of a longitudinal plunger 31 extending at a generally upward and rearward incline above said cross shaft 23. The plunger 31 is carried in a suitable guide sleeve 32. At its front end the guide sleeve 32 is pivoted, as at 33, to a post 34 on the forward portion of the main frame 1.

A fluid pressure actuated power cylinder 35, preferably of double-acting type, is disposed lengthwise above the plunger 31; being pivoted, at the front end, as at 36, to the post 34. A connecting rod 37 extends rearwardly from the cylinder and is pivotally connected, as at 38, with the rear end portion of the plunger 31. The cylinder 35 is incorporated in a valve controlled, fluid pressure system, which includes a valve accessible to the tractor operator, such system being shown in part at 39.

When the cylinder 35 is operated to retract rod 37, the plunger 31 slides forwardly, causing rotation of the lift control cross shaft 23 in a direction to swing the levers 24 in a similar direction, and to cause raising of the lift frames 12.

When both of the plow units are in raised position they latch in such position by means of longitudinal latch bars 40 pivotally connected to, and extending forwardly from, corresponding swing frames 12, and having gravitational latching engagement with latch pins 41 fixed relative to the main frame 1. Each of the latch bars 40 includes a pull cord 42 leading forwardly to the tractor whereby the tractor operator may selectively and independently control the releasing of the aforesaid latch bars 40.

When the implement is in use, the plow units A and B are employed, alternately, one being down and the other up as the implement traverses a field in one direction, while the position of the plow units is reversed when the implement traverses the field in the other direction. This is accomplished by the operator releasing the latch bar 40 of only the plow unit which he desires to use; it being understood that the plow units automatically latch up when adjusted to raised position.

For transport from place to place both plow units A and B are permitted to remain in their raised, latched position.

The plow shares 18 of each plow unit are set so that one share trails the corresponding wheel 3, while the other share works laterally out therefrom, so that the wheel may ride on firm ground. A sod blade 43 is fixed to the outside of each swing frame 12 and works in cooperative relation to the laterally out or leading share of the adjacent pair thereof.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A plow comprising a longitudinal main frame adapted at its front end for connection to a tractor, wheels supporting the main frame adjacent its rear end, a transversely spaced pair of swing frames pivoted at one end to the main frame for up and down swinging adjustment, plow standards mounted in connection with the swing frames adjacent the opposite end, plow shares on the standards, and power actuated mechanism operative to raise the swing frames and corresponding shares between lowered working positions and raised inoperative positions; said mechanism including a lift control shaft journaled transversely on the main frame, power means to rotate said shaft, levers on said shaft corresponding to the swing frames, bellcrank levers on the swing frames, operating connections between the shaft levers and one leg of corresponding bellcrank levers, and links between the other legs of the bellcrank levers and the main frame.

2. A plow comprising a longitudinal main frame adapted at its front end for connection to a tractor, wheels supporting the main frame adjacent its rear end, a pair of transversely spaced, longitudinal swing frames pivoted at the front end for up and down motion, plow assemblies depending from the rear ends of the swing frames, a transverse lift control cross shaft on the main frame ahead of the swing frames, upstanding levers on the cross shaft corresponding to and alined with the swing frames, a bellcrank lever on each swing frame adjacent its rear end, a connection element between each upstanding lever and an upstanding leg of the corresponding bellcrank lever, a link between the other leg of each bellcrank lever and the main frame, a third lever on the transverse shaft, and a fluid pressure actuated power cylinder mounted in connection with said third lever.

3. A plow comprising a longitudinal main frame adapted at its front end for connection to a tractor, wheels supporting the main frame adjacent its rear end, a pair of transversely spaced, longitudinal swing frames pivoted at the front end for up and down motion, plow assemblies depending from the rear ends of the swing frames, a transverse lift control cross shaft on the main frame ahead of the swing frames, upstanding levers on the cross shaft corresponding to and alined with the swing frames, a bellcrank lever on each swing frame adjacent its rear end, a connection element between each upstanding lever and an upstanding leg of the corresponding bellcrank lever, a link between the other leg of each bellcrank and the main frame, a third lever on the transverse shaft, and a fluid pressure actuated power cylinder mounted in connection with said third lever; there being a gravitationally seated but releasable latch bar pivoted on each swing frame and extending longitudinally forward, and a latch pin, cooperating with each latch bar, rigid with the main frame.

4. A plow comprising a wheel supported longitudinal main frame, a pair of transversely spaced swing frames pivoted at one end to the main frame for up and down swinging adjustment, plow standards mounted in connection with the swing frames, plows on said standards, means operative to swing the swing frames up and down relative to the main frame, such means comprising a lift control shaft journaled on the main frame transversely thereof, lever and link connections between the shaft and swing frame operative to swing the swing frames upon turning of the shaft, a radial lever fixed to the shaft, a support on the main frame, a sleeve pivoted at one end to the support, a plunger slidable in the sleeve, means pivotally connecting the lever with the plunger at a point intermediate the ends of the latter, and a hydraulic ram pivoted at one end to the support and pivoted at the other end to the outer end of the plunger.

JAMES E. DOOLEY.

REFERENCES CITED

The following references are of record in the file of this patent:

UNITED STATES PATENTS

| Number | Name | Date |
|---|---|---|
| Re. 14,017 | Fjarli | Nov. 23, 1915 |
| 435,513 | McGuire | Sept. 2, 1890 |
| 814,046 | Houghton | Mar. 6, 1906 |
| 850,749 | Hammers | Apr. 16, 1907 |
| 966,662 | Danielsen | Aug. 9, 1910 |
| 1,089,213 | Hallbauer | Mar. 3, 1914 |
| 1,262,304 | Carpenter | Apr. 9, 1918 |
| 1,270,525 | Kardell | June 25, 1918 |
| 1,348,219 | Jones | Aug. 3, 1920 |
| 1,817,085 | Lindgren | Aug. 4, 1931 |
| 2,249,861 | Silver | July 22, 1941 |
| 2,363,901 | Silver | Nov. 28, 1944 |
| 2,366,155 | Silver | Jan. 2, 1945 |
| 2,385,935 | Oerman | Oct. 2, 1945 |

FOREIGN PATENTS

| Number | Country | Date |
|---|---|---|
| 691,630 | France | July 15, 1930 |
| 601 | Great Britain | 1870 |
| 308,847 | Great Britain | Apr. 4, 1929 |